United States Patent [19]

Krambrock

[11] 4,171,925

[45] Oct. 23, 1979

[54] PNEUMATIC CONVEYING SYSTEM

[75] Inventor: Wolfgang Krambrock, Vogt, Fed. Rep. of Germany

[73] Assignee: Waeschle Maschinenfabrik GmbH, Ravensburg, Fed. Rep. of Germany

[21] Appl. No.: 934,547

[22] Filed: Aug. 17, 1978

[30] Foreign Application Priority Data

Aug. 19, 1977 [DE] Fed. Rep. of Germany ....... 2737536

[51] Int. Cl.² .............................................. B65G 53/16
[52] U.S. Cl. ........................................ 406/95; 137/508
[58] Field of Search ....................... 302/24, 26, 29, 31, 302/35; 137/508

[56] References Cited

U.S. PATENT DOCUMENTS

| | | | |
|---|---|---|---|
| 1,038,527 | 9/1912 | Coleman | 137/508 X |
| 2,897,005 | 7/1959 | Wiltse | 302/24 |
| 3,929,379 | 12/1975 | Krambrock | 302/24 |
| 4,067,622 | 1/1978 | Krambrock et al. | 302/24 |

FOREIGN PATENT DOCUMENTS 758917 6/1954 Fed. Rep. of Germany ........... 137/508

2403533 8/1975 Fed. Rep. of Germany ............ 302/24

*Primary Examiner*—James L. Rowland
*Attorney, Agent, or Firm*—Michael J. Striker

[57] ABSTRACT

A pneumatic conveying system includes a conveying conduit, a gas conduit which communicates with it at least at one juncture, and a release valve at the juncture. The release valve includes a housing connected with the conveying conduit and the gas conduit, a flexible diaphragm secured to the housing and subdividing the same into one chamber communicating with the gas conduit and another chamber connected with the conveying conduit, the diaphragm having a substantially central opening, a valve-seat member connected to and movable with the diaphragm in response to flexing of the same and forming a valve seat surrounding the opening, a valve member carried by the housing and located in the one chamber, means guiding the valve seat member for movement relative to the valve member between a valve-opening and a valve-closing position, and valve-closing spring means located in the one chamber and permanently tending to urge the valve-seat member to the valve-closing position thereof.

6 Claims, 1 Drawing Figure

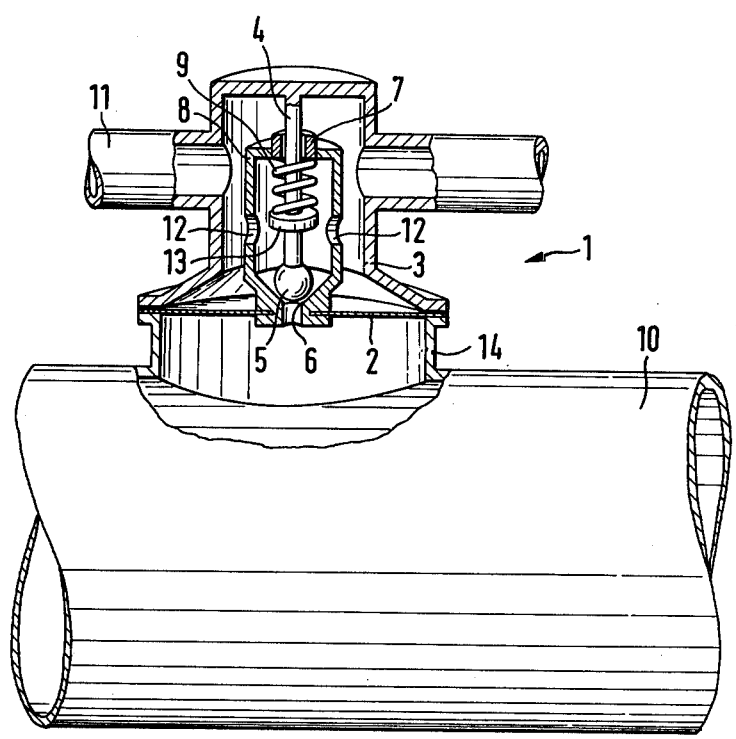

PNEUMATIC CONVEYING SYSTEM

BACKGROUND OF THE INVENTION

1. Field of the Invention

The present invention relates to pneumatic conveying systems.

2. The Prior Art

Flowable particulate materials may be pneumatically conveyed in a conveying conduit. Such a conduit may, however, at times become clogged if accumulations of the particulate material occur, a possibility which can not be totally avoided.

To overcome this problem it has been proposed in German Allowed Application AS No. 2,305,030 to provide a secondary gas conduit which communicates with the conveying conduit at intervals, via release valves. When pressure decreases in a section of the conveying conduit because of clogging due to material-accumulation, the release valve in this section will automatically open since the pressure in the conveying conduit is now lower than that in the secondary conduit, and a burst of gas will be admitted into the conveying conduit to clear the obstruction.

A problem experienced with the prior art constructions is that the known release valves do not close tightly enough to prevent the conveyed material—especially if the same is in form of very small particles, e.g. in pulverulent form—from entering into the secondary conduit. This is highly undesirable, but heretofore unavoidable because the known release valves must operate at very small pressure differentials of about 1000 mm water column or less. Evidently, irrespective of the type of release valve used (e.g. ball valves, plate valves, or the like) a low response pressure means that the valve will have a correspondingly low closing pressure which will permit conveyed material to penetrate into the secondary conduit, especially after the valve has just been operated and has then returned to its closed position.

Consideration has already been given to use release valves which are constructed analogous to the valves used on vehicle tires. However, these valves—although able to prevent the entry of dust-like particles of conveyed material—have been found unsuitable for the type of application here under discussion, because they open only at pressure differentials which are substantially in excess of the ones at which gas must be permitted to enter the conveying conduit from the secondary conduit in order for the system to function satisfactorily.

A safety relief valve is known from German Pat. No. 758,917 which operates at a low pressure differential but has a high closing pressure nevertheless. Despite the fact that this valve thus meets the two above enumerated requirements, it is not suitable for use in the environment with which the invention is concerned. The reason for this is that the movable components of the valve, e.g. the valve spring and the valve-member guide, must be located in the downstream portion of the valve housing, as considered with reference to the direction of gas flow through the valve. If the valve were to be used in a pneumatic conveying system, this housing portion would have to face toward and communicate with the conveying conduit; the result would be rapid clogging of the valve by the conveyed material.

SUMMARY OF THE INVENTION

Accordingly, it is an object of the present invention to provide an improved pneumatic conveying system which reliably avoids the penetration of conveyed material into the secondary gas conduit.

A more particular object of the invention is to provide such a system which has an improved type of release valve wherein the material penetration is avoided.

Still a further object of the invention is to provide an improved release valve which is especially well suited for use in pneumatic material-conveying systems.

A concomitant object is to provide such a valve wherein all components sensitive to clogging and/or wear by contact with the particulate (especially dust-like) material are located at a side of the valve which communicates with the secondary gas conduit.

In keeping with these objects, and with still others which will become apparent hereafter, one feature of the invention resides, in a pneumatic conveying system of the type having a conveying conduit and a gas conduit which communicates with the conveying conduit at least at one junction, in a release valve located at that junction and comprising a housing connected with the conveying conduit and the gas conduit; a flexible diaphragm secured to the housing and subdividing the same into one chamber communicating with the gas conduit and another chamber connected with the conveying conduit; the diaphragm having a substantially central opening; a valve-seat member connected to and movable with the diaphragm in response to flexing of the same and forming a valve seat surrounding the opening; a valve member carried by the housing and located in the one chamber; means guiding the valve seat member for movement relative to the valve member between a valve-opening and a valve-closing position; and valve-closing spring means located in the one chamber and permanently tending to urge the valve-seat member to the valve-closing position thereof.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

The single FIGURE is a fragmentary partly sectioned view, illustrating one embodiment of the invention.

DESCRIPTION OF THE PREFERRED EMBODIMENTS

The FIGURE shows only a portion of a pneumatic conveying system. The system itself may be constructed in, e.g., conformance with the one shown in the aforementioned German Allowed Application 2,305,030 and will have a material-conveying conduit 10 for the conveyance of particulate flowable (e.g. pulverulent) materials, and a secondary gas conduit 11 which communicates with the conduit 10 at a plurality of longitudinally spaced junctions.

In accordance with the invention each of these junctions is provided with a release valve 1 having the construction which will be described subsequently. Since all the junctions are substantially identical, one only is shown in the drawing, it being understood that the description thereof suffices for an understanding of the invention and applies to the other junctions also.

The particulate material (not shown) is conveyed pneumatically through the conduit 10. The gas conduit 11 contains a gas, such as air (only gas; no particulate material) under pressure. Its purpose is to admit a burst of gas into the conduit 10 if, due to a build-up of material and consequent clogging of the conduit 10, the pressure drops in the same. The burst of gas is intended to eliminate the obstruction and maintain the conduit 10 free.

To permit the introduction of such bursts of gas from conduit 11 into conduit 10, the two are connected at junctions corresponding to the one which is illustrated in the drawing. At each junction the conduit 10 has a socket 14 to which a housing 3 is connected; socket and housing have abutting flanges, as shown. Housing 3 may be connected to conduit 11 in suitable manner (e.g. by welding) or could even be formed of one piece with the same.

The release valve 1 has a diaphragm 2 of, e.g., natural or synthetic rubber or a suitable synthetic plastic material. The outer circumferential edge of the diaphragm is sealingly secured between the flanges of the housing 3 and socket 14, e.g. by being clamped between these flanges. Diaphragm 2 carries an inner housing 8 provided with a plurality of apertures 12 via which the interior of housing 8 communicates with the interior of housing 3. The end of housing 8 which is connected to the diaphragm 2 is formed with a valve seat 6 surrounding a passage which communicates with the interior of socket 14 (and hence with the interior of conduit 10); the other end of housing 3 is formed with a sleeve 7.

A valve rod 4 is of one piece with the housing 3; however, it could also be rigidly connected to the same by welding, threading or the like. The rod 4 extends through the sleeve 7 into the housing 8 and carries at its free end a valve member 5 which in the illustrated embodiment is ball-shaped. The valve member 5 is rigid with and stationary on the rod 4, but it could be made adjustable lengthwise of the same to a limited extent (e.g. via cooperating threads on members 4 and 5).

A valve-closing spring 9 surrounds the rod 4 within the housing 8; its opposite ends bear upon the housing 8 and an abutment 13 (here in form of a circular plate or washer) mounted on the rod 4. The abutment 13 may be of one piece with or otherwise fixed (e.g. by welding) to the rod 4. However, it is more advantageous if abutment 13 can be moved axially of the rod 4, e.g. by providing rod 4 and abutment 13 with cooperating screw threads, since this permits the prestress of spring 9 to be varied by a user and thereby to change the closing and opening pressures of the valve.

Since the housing 8 moves with (slides on rod 4) the diaphragm 2 whereas the valve member 5 is stationary, spring 9 which tends to slide the housing 8 along the rod 4 in direction away from the conduit 10, causes the valve seat 6 to sealingly engage the valve member 5.

If, however, the pressure in conduit 10 drops due to clogging of the conduit 10, then the gas pressure in conduit 11 is able to overcome the pressure of spring 9 and to flex the diaphragm 2 in direction inwardly of the conduit 10. This causes the housing 8, and thereby the valve seat 6, to move away from the valve member 5, thereby opening the valve 1 and admitting gas from conduit 11 into conduit 10 to clear away the obstruction in the latter.

The entire surface area of the diaphragm 2 is available for the pressure exerted by the gas in conduit 11, i.e. for the opening of the valve. The area of diaphragm 2 can, of course, be chosen at will and can therefore be made quite large while at the same time it is not at all necessary for the contact area between valve seat 6 and valve member 5 to be equally large. Consequently, the valve can respond (i.e. open) at a small pressure differential (between conduits 10 and 11) despite the fact that in closed position the valve member 5 and the valve seat 6 engage one another at rather high pressure (so that the entry of dust and the like from conduit 10 into conduit 11 is reliably prevented). For example, if the diaphragm 2 is of circular outline and has a diameter of 25 mm, and the valve seat 6 has a diameter of 5 mm, the closing pressure of the valve (engagement of seat 6 with member 5) may be 2.5 bar; despite this, the valve may open at a pressure differential of only 0.1 bar.

The valve member 5 need not be ball-shaped. However, this configuration has several advantages. It assures automatic adjustment of the position of the members 5 and 6 relative to one another. Furthermore, due to the line contact between the members 5 and 6 there will be strong pressure at the line of contact when the valve is closed, thereby assuring especially good protection against the entry of particles from the conduit 10. Also, the member 5 and at least the portion of housing 8 which forms the valve seat 6 are advantageously of metal; due to this and to the absence of resiliently deformable seals the valve components which participate in the sealing action are not subject to deformation and will not exhibit any significant aging and/or wear.

If desired, additional means (e.g. a suitable valve) may be incorporated in the gas conduit 11 at a location downstream of the respective valve 1 (e.g. to the left of valve 1 in the drawing, if this is supplied from the right) to close the conduit 11 in response to opening of the valve 1, and to open the conduit again when the valve 1 closes.

While the invention has been illustrated and described as embodied in a pneumatic conveying system, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. In a pneumatic conveying system of the type having a conveying conduit and a gas conduit which communicates with the conveying conduit at least at one juncture, a release valve at said juncture and comprising a housing connected with said conveying conduit and said gas conduit; a flexible diaphragm secured to said housing and subdividing the same into one chamber communicating with said gas conduit and another chamber connected with said conveying conduit, said diaphragm having a substantially central opening; a valve-seat member connected to and movable with said diaphragm in response to flexing of the same and forming a valve seat surrounding said opening; a valve member carried by said housing and located in said one chamber; means guiding said valve seat member for movement relative to said valve member between a valve-opening and a valve-closing position; and valve-closing spring means located in said one chamber and permanently tending to urge said valve-seat member to said valve-closing position thereof.

2. A valve as defined in claim 1, said guide means comprising a valve rod rigid with said housing and carrying said valve member.

3. A valve as defined in claim 2, said housing being an outer housing; and wherein said valve seat member is an inner housing located in said one chamber, said inner housing being elongated in direction substantially normal to said diaphragm and having one end portion adjacent to the same and provided with said valve seat, and another end portion remote from said diaphragm and provided with a sleeve through which said rod extends into said inner housing, said sleeve being freely slidable along said rod.

4. A valve as defined in claim 3, said spring means comprising a helical spring surrounding said rod and bearing upon said inner housing and said rod, respectively.

5. A valve as defined in claim 4, said rod comprising a transversely projecting abutment, and said spring bearing upon said abutment axially of said rod.

6. A valve as defined in claim 1, wherein said valve member is of spherical shape.

* * * * *